United States Patent
Liden et al.

(10) Patent No.: US 11,972,331 B2
(45) Date of Patent: Apr. 30, 2024

(54) VISUALIZATION OF TRAINING DIALOGS FOR A CONVERSATIONAL BOT

(71) Applicant: Microsoft Technology Licensing, LLC, Redmond, WA (US)

(72) Inventors: Lars H. Liden, Seattle, WA (US); Swadheen K. Shukla, Seattle, WA (US); Shahin Shayandeh, Seattle, WA (US); Matthew D. Mazzola, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/981,708

(22) Filed: Nov. 7, 2022

(65) Prior Publication Data
US 2023/0055720 A1 Feb. 23, 2023

Related U.S. Application Data

(63) Continuation of application No. 16/388,015, filed on Apr. 18, 2019, now Pat. No. 11,521,114.

(51) Int. Cl.
*G06F 16/901* (2019.01)
*G06F 3/0482* (2013.01)
*G06N 5/04* (2023.01)
*G06N 20/00* (2019.01)
*H04L 51/02* (2022.01)

(52) U.S. Cl.
CPC ........... *G06N 20/00* (2019.01); *G06F 3/0482* (2013.01); *G06F 16/9027* (2019.01); *G06N 5/04* (2013.01); *H04L 51/02* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 8,996,917 B1 * | 3/2015 | Chandramohan | G06F 11/3696 714/28 |
| 10,586,530 B2 | 3/2020 | Liang et al. | |
| 10,896,670 B2 | 1/2021 | Eisenzopf | |
| 11,037,563 B2 | 6/2021 | Akkiraju et al. | |
| 11,107,006 B2 | 8/2021 | Eisenzopf | |
| 11,368,420 B1 | 6/2022 | Crook et al. | |

(Continued)

FOREIGN PATENT DOCUMENTS

| | | | |
|---|---|---|---|
| CN | 106663219 A | 5/2017 | |
| CN | 106713485 A | 5/2017 | |
| CN | 106850589 A | 6/2017 | |

OTHER PUBLICATIONS

"Office Action Issued in European Patent Application No. 19720307.8", dated Oct. 28, 2022, 7 Pages.

(Continued)

*Primary Examiner* — Di Xiao
(74) *Attorney, Agent, or Firm* — Rainier Patents, P.S.

(57) ABSTRACT

This document relates to creating and/or updating a chatbot using a graphical user interface. For example, training dialogs for a chatbot can be displayed in a tree form on a graphical user interface. Based at least on interactions between a developer and the graphical user interface, the training dialogs can be modified in the tree form, and training dialogs can be updated based on the modifications provided on the tree form via the graphical user interface.

20 Claims, 6 Drawing Sheets

(56) References Cited

U.S. PATENT DOCUMENTS

| | | | |
|---|---|---|---|
| 2003/0065673 A1* | 4/2003 | Grobler | G06F 16/248 |
| 2011/0213843 A1 | 9/2011 | Ferrazzini et al. | |
| 2012/0041903 A1* | 2/2012 | Beilby | G06N 20/00 |
| | | | 706/11 |
| 2014/0288932 A1* | 9/2014 | Yeracaris | G10L 17/10 |
| | | | 704/249 |
| 2016/0259767 A1 | 9/2016 | Gelfenbeyn et al. | |
| 2017/0113348 A1 | 4/2017 | Monceaux | |
| 2017/0316777 A1 | 11/2017 | Perez et al. | |
| 2018/0129739 A1* | 5/2018 | Jones | G06F 16/367 |
| 2018/0226067 A1 | 8/2018 | Dhoolia et al. | |
| 2018/0316630 A1 | 11/2018 | Jacobson | |
| 2019/0138921 A1* | 5/2019 | Narasimhan | G06N 5/045 |
| 2020/0073938 A1* | 3/2020 | Losalka | G06F 40/295 |
| 2020/0082940 A1* | 3/2020 | Qiao | G06N 5/043 |
| 2020/0143386 A1* | 5/2020 | Tomlinson | G06Q 30/016 |

OTHER PUBLICATIONS

"Office Action Issued in Indian Patent Application No. 202117044997", dated Aug. 2, 2023, 8 Pages.
"Office Action and Search Report Issued in Chinese Patent Application No. 202080028970.6", dated Sep. 14, 2023, 16 Pages.
"Final Office Action Issued In U.S. Appl. No. 15/992,143", dated Oct. 5, 2023, 44 Pages.
Office Action Received for Chinese Application No. 201980030731.1, mailed on Feb. 2, 2024, 14 pages (English Translation Provided).

* cited by examiner

FIG. 2

| MICROSOFT | PROJECT CONV. LEARNER | MY MODELS | DOCUMENTS | FEEDBACK | | | | ⚙ SETTINGS |

GUI 200

PIZZA BOT
VERSION: MASTER [LIVE]
TRAINING: ⊘ COMPLETED
LAST UPDATED:
13 SEC. AGO

🏠 HOME
≡ ENTITIES
≡ ACTIONS
≡ TRAINING DIALOGS
≡ LOG DIALOGS
← MY MODELS

🔄 TRAINING DIALOGS

[NEW TRAINING DIALOG] 202    [TREE VIEW] 204

SEARCH: 🔍 206

FILTER BY TAG: 208    FILTER BY ENTITY: 210    FILTER BY ACTIONS: 212
[ALL TAGS ▾]    [ALL ENTITIES ▾]    [ALL ACTIONS ▾]

| DESCRIPTIONS | TAGS | TURNS | LAST MODIFIED | CREATED |
|---|---|---|---|---|
| PLACE AN ORDER – YES | – | 9 | 3/13/19 | 3/13/19 |
| NEW ORDER – NO | – | 9 | 3/13/19 | 3/13/19 |
| ORDER A PIZZA WITH CHEESE – YES | – | 3 | 3/13/19 | 3/13/19 |
| PIZZA WITH PEPPERS AND OLIVES – NO THANKS | – | 6 | 3/13/19 | 3/13/19 |
| ORDER A CHEESE PIZZA – NO | – | 8 | 3/13/19 | 3/13/19 |
| I'M HUNGRY – MUSHROOMS AND CHEESE | – | 9 | 3/13/19 | 3/13/19 |
| MUSHROOM PIZZA – NO | – | 9 | 3/13/19 | 3/13/19 |

214

VISUALIZATION OF TRAINING DIALOGS FOR A CONVERSATIONAL BOT

BACKGROUND

The extensive use of the Internet in recent years has resulted in a vast array of online information resources and services that are made available to users. People today spend a large and ever-increasing amount of time interacting with companies online, and companies are becoming interested in new methods for handling user interaction with customers. In certain instances, chatbots are being employed in order to make it easier for users to interact with the companies and accomplish their desired actions.

A chatbot refers to a computer-implemented conversational system that provides a communication service, where the chatbot is conventionally based upon hard-coded declarative rules, which enable users to interact with the chatbot by way of a chat interface. The service can be any suitable service, such as providing customer support for a website that is designed for commerce, such as a food ordering service. In operation, a user provides input to the chatbot by way of an interface (where the interface can be a microphone, a graphical user interface that accepts input, etc.), and the chatbot responds to such input with response(s) that are identified (based upon the input) as being helpful to the user. Responses output by the chatbot in response to the input may be in the form of text, graphics, audio, gestures (e.g., by a robot) or other types of human-interpretable content. The chatbot may also programmatically interact with external computer systems for sending or receiving information in response to the input.

Conventionally, creating a chatbot and updating a deployed chatbot can be difficult tasks. In an example, a chatbot can typically be created programmatically (i.e., a programmer codes the interaction model for the chatbot) or via a design tool that can be used to create declarative rules, which are then used by the chatbot to determine appropriates responses to inputs. However, these methods of creating chatbots introduce difficulties, as updating a programmatic-based chatbot can require computer programming expertise, and updating a declarative rules chatbot can introduce difficulties in appropriately determining the logic flow of the chatbot due to the complexity of visualizing rules as the chatbot becomes more sophisticated.

An alternative approach to developing a chatbot involves using machine learning based on sample training dialogs that are provided by a developer of the chatbot. Based on these training dialogs, the chatbot can attempt to determine appropriate response to unexpected inputs. However, machine learned models can often be viewed as a black box to a developer, as it can be difficult to ascertain whether the training dialogs in use adequately cover the logic flow necessary for the chatbot to handle different situations, or what the chatbot may be relying on to select a particular decision based on an input.

As such, while the use of training dialogs addresses some of the issues associated with chatbots created programmatically or using declarative rules, there remain difficulties in updating chatbot functionality in an efficient manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for visualizing and editing chatbot training dialogs and rules. One example includes a method or technique that can be performed on a computing device. The method can include accessing one or more stored training dialogs associated with a conversational system. The method can also include receiving a selection to display the training dialogs in a tree form, and generating the tree form of the training dialogs based at least on the received selection, the tree form displaying the stored training dialogs as nodes with branches representing decision points. The method can further include updating the stored training dialogs based at least on modifications received to the tree form.

Another example includes an alternative method or technique that can be performed on a computing device. The method can include displaying on a graphical user interface (GUI) a visual tree representing training dialogs associated with a conversational system. The method can also include receiving a modification to one or more of the training dialogs via the GUI, propagating the modification to training dialogs in the visual tree that are dependent on the modified one or more training dialogs, and updating a database of training dialogs based at least on the received modification Another example includes a system comprising a display configured to depict a graphical user interface, a processor, and a storage memory storing computer-readable instructions, which when executed by the processor, cause the processor to display, via the graphical user interface, data associated with training dialogs that represent interactions with a chatbot, receive an indication from a user of the system to display the data associated with the training dialogs in a tree form, determine whether decisions depicted in the tree form are based at least on declarative rules or based at least on machine learning, and display the tree form decisions based at least on declarative rules differently from training dialogs based at least on machine learning.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 2-4 illustrate example graphical user interfaces that are consistent with some implementations of the present concepts.

DETAILED DESCRIPTION

Overview

Figure 1:
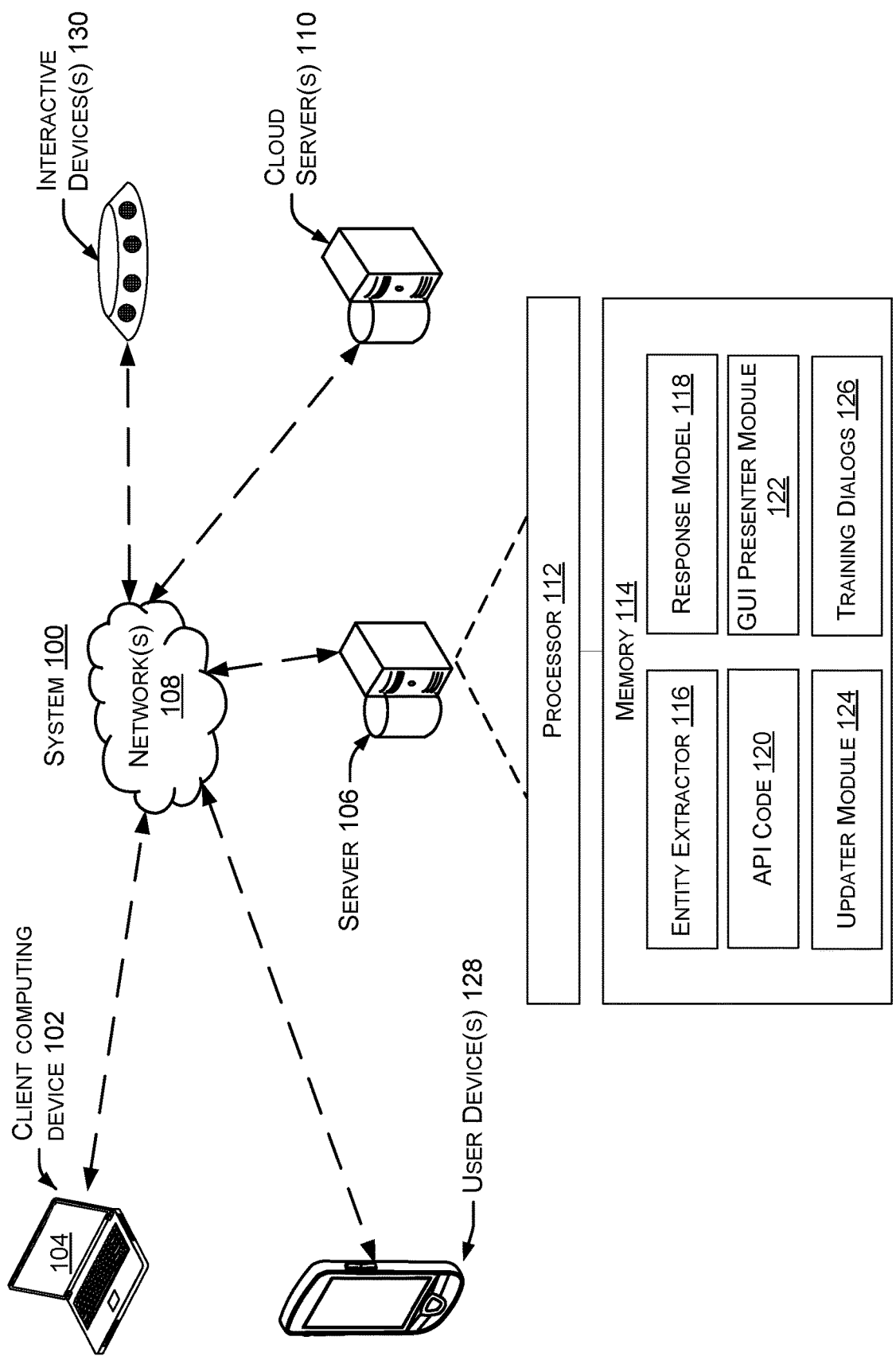
FIG. 1 illustrates an example system that is consistent with some implementations of the present concepts.

As is appreciated in the arts of the Internet, electronic messaging, artificial intelligence, and natural language understanding, a chatbot (also known as a chat bot, a chatterbot, a talkbot, and a chat robot, among other things)

is a computer-based conversational agent/entity that is designed to conduct a natural human conversation or interaction (e.g., conversational chat, gesturing, or other visual depictions of interactions, such as animation of a character on a display) with one or more users. For purposes of this disclosure, the term "conversation" will be used to refer to the interaction between an end user and a chatbot, irrespective of the input/output of the system.

More particularly, a chatbot responds to input from users in a way that moves the conversation forward in a contextually meaningful way, thus generating the illusion of intelligent understanding. A general goal of many chatbots is to provide value and ease of use to users by trying to understand what they want and then providing them with the information they need, or performing the action(s) they are requesting. The term "user" is used herein to refer to a person who utilizes a network-enabled end-user computing device to communicate with a chatbot. Example types of network-enabled end-user computing devices are described in more detail hereafter.

A wide variety of computing (e.g., software-based) applications exist today that people can use to perform desired actions, where these applications often involve the transfer of information across a data communication network such as the Internet (among other types of networks). Chatbots are increasingly being employed in many of these computing applications in order to make it easier for people interact with the applications and accomplish their desired actions. Example computing applications that currently employ chatbots include electronic commerce and banking applications, online food services, customer service applications, electronic messaging applications, and automated online assistance applications that provide "call center" and customer assistance functionality (i.e., either by way of direct interaction with a user, or by generating scripts for use by customer service representatives), among many others. The conversational intelligence of a given chatbot is typically limited to a particular context or range of contexts that correspond to the particular computing application for which the chatbot is being employed.

Chatbots can typically interact with users based on a number of different input styles, and in some instances, a user may utilize natural language to communicate (e.g., interact/converse/chat) with the chatbots. The term "natural language" is used herein to refer to words, or phrases, or one or more complete sentences typically used by human beings to communicate with one another in speech or written communications. However, in certain instances, other types of user input can be utilized either in place of or in combination with natural language, such as by receiving mouse/cursor clicks from a user, receiving image data uploaded from a user, or by way of determining biometric states associated with a user, such as if the user appears under tension or is happy or sad.

Such chatbots are generally based on sets of declarative rules that are created by a developer of the chatbot, which are used to determine appropriate responses based on detected entities found in the input. Additionally, or in place of declarative rules, a developer may define the chatbot's reactions to inputs from a programmatic standpoint, which generally requires coding the individual actions of the chatbot in a programming language.

More sophisticated chatbots may combine programmatic or declarative-rules-based processing with machine learning techniques. Specifically, a set of basic rules can be provided for a chatbot by a developer, and then various machine learning techniques can be utilized to increase the conversational intelligence of the chatbots and thus broaden the range of contexts that they can support. While declarative-rules-based systems can generally be created viewed as trees or graphs, the introduction of machine learning makes integration difficult because of the lack of ability to visualize the machine learning aspects in combination with the declarative rules. As such, one implementation is directed to providing an ability to visualize machine learning aspects alongside declarative rules, and enable editing of both.

In one implementation, the chatbot may utilize an entity extractor module that can be configured to identify and extract entities in input provided by users, and a response model that can be configured to select outputs to provide to the users in response to receipt of the inputs from the users (where the outputs of the response model are based upon most recently received inputs, previous inputs in a conversation, entities identified in the conversation, and existing data resulting from API calls). The response model can be based on declarative rules, or based on information derived from machine learning. For instance, the response model can be an artificial neural network (ANN), such as a recurrent neural network (RNN), or other suitable neural network, which can be configured to receive input (such as text, location, etc.) and provide an output based upon such input and a current state of the neural network.

To train such chatbots, typically training dialogs are used to provide a number of example dialogs that indicate particular inputs along with the correct response to those inputs. A training dialog refers to a conversation between the chatbot and the developer that can be conducted by the developer to train the entity extractor module and/or the response model. For ease of developing the training dialogs, a number of graphical user interface (GUI) features can be utilized to create and/or update a chatbot. When the developer provides input to the chatbot, the GUI features can identify entities in user input identified by the extractor module, and further identify the possible responses of the chatbot. Based on the training dialogs, the chatbot can appropriately parse the input and attempt to respond in an intelligent manner to the input.

For example, the GUI features can be configured to present types of entities and rules corresponding to the entities, with a developer being able to customize certain entity types and associated rules, such as whether an entity type can appear in user inputs, system responses, or both, and whether the entity type supports multiple values, among other rules. The GUI features can also present a list of available responses, and are further configured to allow a developer to edit an existing response or add a new response. When the developer indicates that a new response is to be added, the response model can be modified to support the new response. Likewise, when the developer indicates that an existing response is to be modified, the response model can be updated to support the modified response.

Alternative and/or additional training for the chatbot can be based on parsing log dialogs, which represent previous interactions between a user and the chatbot. The chatbot can then be trained based at least upon these previous interactions reflected in the log. For instance, the developer can be presented with a dialog (e.g., conversation) between an end user (e.g., other than the developer) and the chatbot, where the dialog includes input set forth by the user and further includes corresponding responses of the chatbot. The developer can select an incorrect response from the chatbot and can inform the chatbot of a different, correct, response. The entity extractor module and/or the response model can then be updated based upon the correct response identified by the developer.

However, with sophisticated chatbots having a large number of training dialogs, often it can be difficult to correctly determine whether all possible training dialogs have been established for the chatbot based on, for example, a simple listing of the training dialogs, and over time a developer may forget to add certain responses based on detected entities in an input, or may not realize that training dialogs result in conflicts in the chatbot logic. Therefore, the GUI features described herein can also be used to present the training dialogs in a visual depiction, such as a tree view. In the tree view, details associated with the training dialogs, such as inputs, actions, or rules associated with actions (i.e., rules that either allow actions to be performed, or impose constraints on the actions, based on the presence or absence of entities) can easily be viewed and edited. The integration of a visual depiction of the training dialogs can therefore enable more efficient and rapid development of the chatbot, and thus, the following description solves the technical problem of adequately determining whether a chatbot's functionality is appropriately addressed through use of the visual depiction, saving developers time and effort Specific features associated with these GUI features are set forth below.

Example System

With reference to FIG. 1, an example system 100 for interactively creating and/or modifying a chatbot is illustrated. A chatbot is a computer-implemented system that can be configured to provide a service based on inputs. The chatbot can be configured to receive input from the user, such as transcribed voice input, textual input provided by way of a chat interface, location information, an indication that a button has been selected, image information, biometric information associated with a user, etc. Thus, the chatbot can, for example, execute on a server computing device and provide responses to inputs set forth by way of a chat interface on a web page that may be viewed on a client computing device. In another example, the chatbot can execute on a server computing device as a portion of a computer-implemented personal assistant.

The system 100 can comprise a client computing device 102 that can be operated by a developer who wishes to create a new chatbot and/or update an existing chatbot. The client computing device 102 can be a desktop computing device, a laptop computing device, a tablet computing device, a mobile telephone, a wearable computing device (e.g., a head-mounted computing device), or the like. The client computing device 102 comprises a display 104, whereupon graphical features described herein are to be shown on the display 104 of the client computing device 102.

The system 100 can further include a server computing device 106 that may be in communication with the client computing device 102 by way of a network 108 (e.g., the Internet or an intranet), and can further communicate with additional cloud server(s) 110. The server computing device 106 can comprise a processor 112 and memory 114, wherein the memory 114 may have various software modules that can be executable by the processor 112 for use in chatbot development. While the example system 100 illustrates the various modules as executing on server computing device 106, it is to be understood that all or portions of modules may alternatively execute on client computing device 102, or on cloud server(s) 110. Alternatively, while certain development of a chatbot may occur using server computing device 106, a developed chatbot can be deployed for execution on a remote computing device, such as cloud server(s) 110, or remote or mobile computing devices that may or may not be connected to network 108.

Memory 114 can include or have access to an entity extractor module 116, wherein the entity extractor module 116 can be configured to identify entities in input text provided to the entity extractor module 116, wherein the entities are of a predefined type or types. For instance, and in accordance with the examples set forth below, when the chatbot is configured to assist with placing an order for a pizza, a user may set forth the input "I would like to order a pizza with pepperoni and mushrooms." The entity extractor module 116 can identify "pepperoni" and "mushrooms" as entities that are to be extracted from the input.

Entities as used herein refer to aspects of the input that the chatbot should operate on, and each entity may have an associated type. For example, assuming the chatbot received an input of "I would like a cheese pizza" the entity extractor module may flag "cheese" as an entity of a type "Topping" to be used in processing the pizza ordering request. Alternatively, if the chatbot received an input of "I would like a square cheese pizza" the entity extractor module may flag "cheese" as an entity of type Topping, and "square" as an entity of type "Pizza shape."

Memory 114 can further include or have access to a response model 118 that can be configured to provide output, wherein the output is a function of the input received from the user, and further wherein the output is optionally a function of entities identified by extractor module 116, previous outputs of response model 118, previous inputs to the response model, and/or a given state associated with the chatbot. For instance, response model 118 can be or include an ANN, such as an RNN.

Memory 114 may additionally comprise computer-executable application programming interface (API) code 120 that can interface with entity extractor module 116 and response model 118. Computer-executable API code 120, for instance, can maintain a list of entities set forth by the user, add entities to the list when requested (e.g., by a developer), or remove entities from the list when requested. Additionally, computer-executable API code 120 can receive output from response model 118 and return entities from memory 114, when appropriate. Hence, when response model 118 outputs "you have $Toppings on your pizza", "$Toppings" can be a call to functionality that can be used for entity substitution within code 120, which retrieves "pepperoni" and "mushrooms" from the list of entities in memory 114, resulting in "you have pepperoni and mushrooms on your pizza" being provided as the output of the chatbot.

In some instances, computer-executable API code 120 may provide additional information to response model 118 that can result in a change of state of the chatbot. For example, based upon information received from a user, computer-executable API code 120 may determine a customer membership level (i.e., Platinum, Gold, Silver, etc.) and may provide such information to response model 118, for ultimate consideration in determining the chatbot's response.

Memory 114 can additionally include a graphical user interface (GUI) presenter module 122 that can be configured to cause a GUI to be shown on display 104 of client computing device 102, wherein the GUI can be configured to facilitate interactive updating of entity extractor module 116 and/or response model 118. Various example GUIs are presented herein, wherein the GUIs are caused to be shown on display 104 of client computing device 102 by GUI presenter module 122.

Memory 114 can also include an updater module 124 that can be configured to update entity extractor module 116 and/or response model 118 based upon input received from the developer when interacting with one or more GUIs presented on display 104 of client computing device 102. Updater module 124 can make a variety of updates, such as but not limited to: 1) training entity extractor module 116 based upon example input that includes entities; 2) updating entity extractor module 116 to identify a new entity; 3) updating entity extractor module 116 with a new type of entity; 4) updating entity extractor module 116 to discontinue identifying a certain entity or type of entity; 5) updating response model 118 based upon a dialog set forth by the developer; 6) updating response model 118 to include a new output for the response model 118; 7) updating response model 118 to remove an existing output from response model 118 (i.e., when a rule prohibits certain actions if certain entities are not present); 8) updating response model 118 based upon a dialog with the chatbot by a user; amongst others. Updater module 124 can be invoked based on inputs received, for example, via a GUI where a developer has modified an existing training dialog. In certain instances, updated module 124 may also provide updated training dialogs to a remote chatbot, such as a copy of the chatbot that is operating on a remote computing device, such as cloud server(s) 110.

Memory 114 may also store one or more training dialogs 126 in a database that may be currently defined for the chatbot system. Specifically, memory 114 may store new training dialogs entered by a developer through the various GUIs created by GUI presenter module 122, and can also receive updates from updater module 124 and appropriately store the updates for later access.

Memory 114 can include both persistent storage resources, such as magnetic or solid-state drives, and volatile storage, such as one or more random-access memory devices. In some cases, the modules described above are provided as executable instructions that are stored on persistent storage devices, loaded into the random-access memory (RAM), and read from RAM by the processor for execution.

Furthermore, there may be one or more user device(s) 128 that can be configured to enable end-users to interact with the chatbot under development. For example, user device(s) 128 may be one or more mobile telephones that can access a web-based interface associated with the chatbot via network(s) 108, enabling users of user device(s) 128 to interact with the chatbot. In certain instances, user device(s) 128 may operate a local copy of the chatbot, such as via a chatbot interface application that may be installed on the user device(s).

Finally, there may be one or more interactive device(s) 130 that are configured to locally operate the chatbot, enabling human interaction with the chatbot via, for example, voice commands. Such interactive device(s) may include, for example, various "smart" home electronics devices or "Internet of things" (IoT) devices that may be communicatively coupled to network(s) 108, or may include devices where the chatbot can be deployed without requiring access to network(s) 108, such as stand-alone GPS units, etc. Finally, interactive device(s) 130 can additionally comprise artificial human devices, such as a robot that may perform gestures in response to user input.

Example User Experience

Figure 3A:
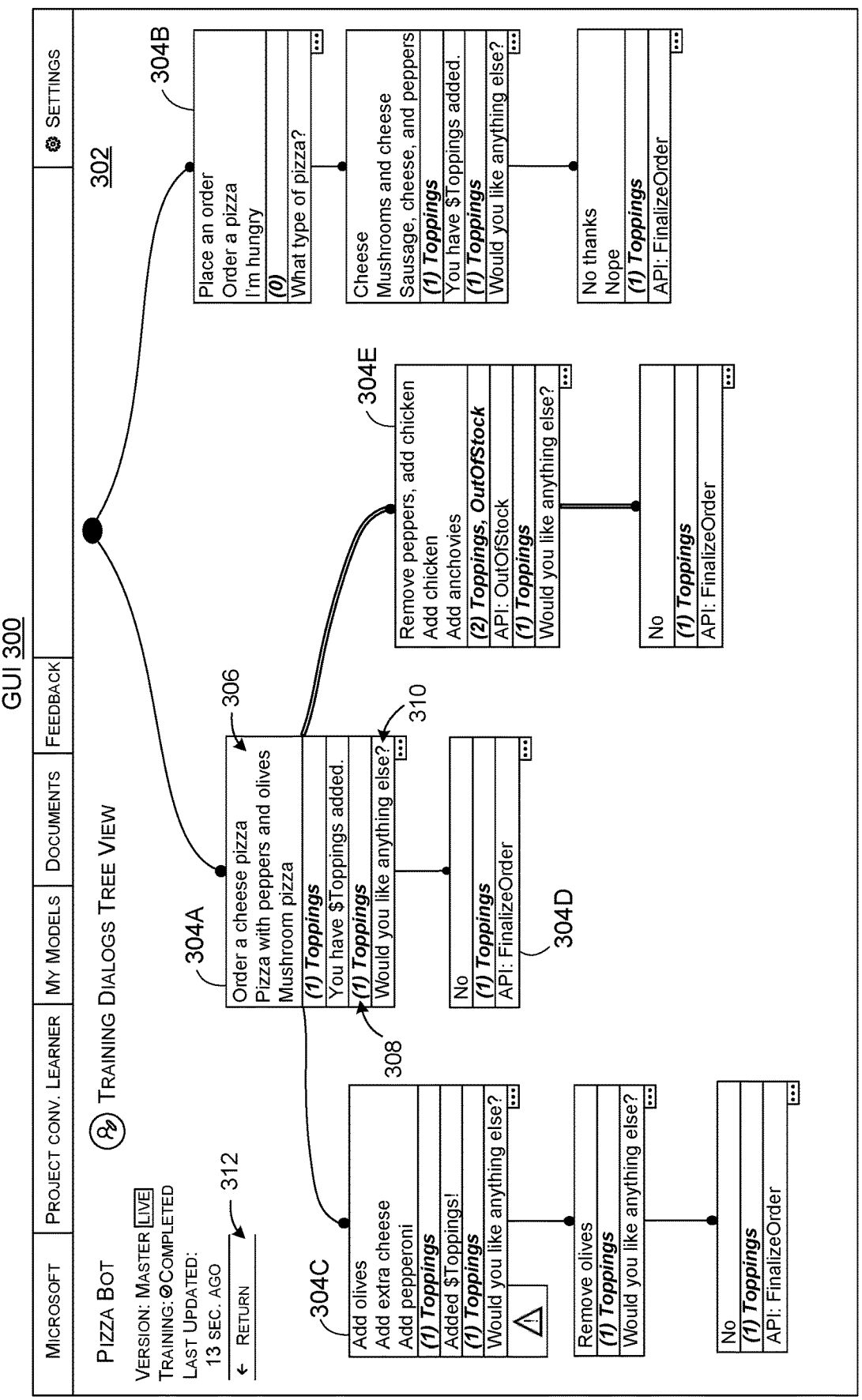
Figure 3B:
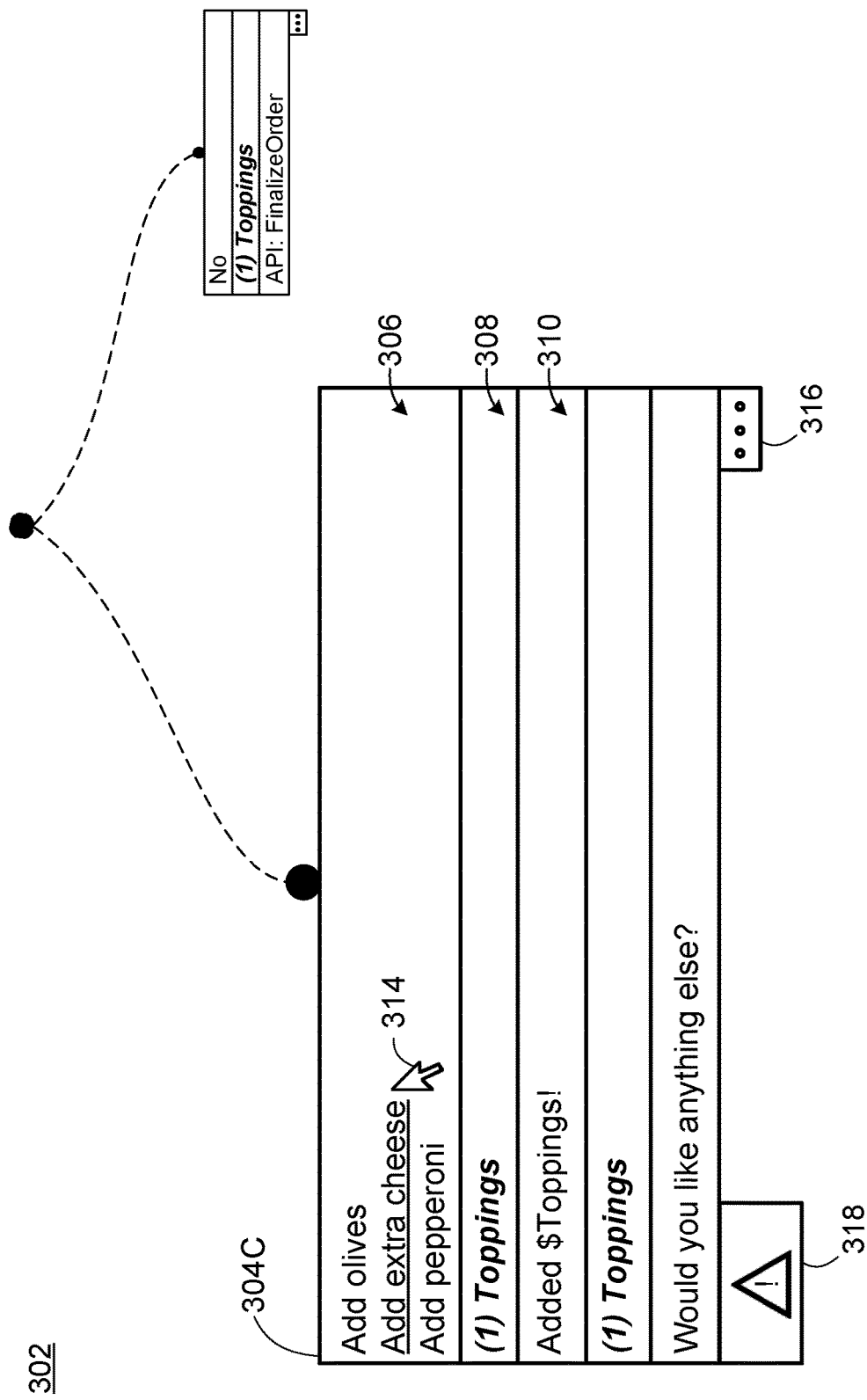
Figure 4:
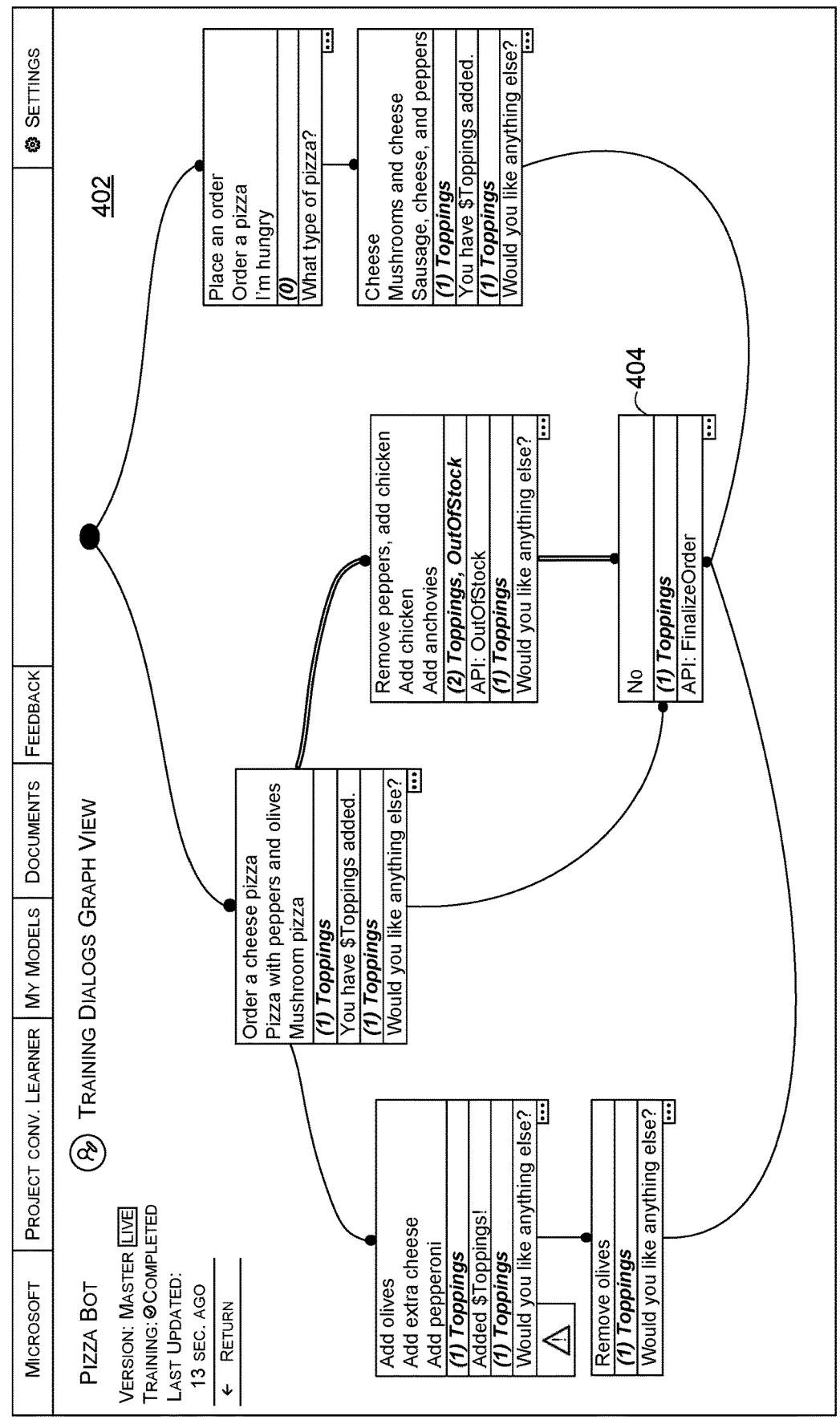

FIGS. 2-4 depict various example GUIs that can be caused to be shown on the display 104 of the client computing device 102 by the GUI presenter module 122. These GUIs illustrate updating an existing chatbot that can be configured to assist users with ordering pizza, however, the GUIs are illustrative in nature, and the features described herein are applicable to any suitable chatbot that relies upon either declarative rules or a machine learning model to generate output.

FIG. 2 depicts an example GUI 200, wherein the GUI 200 is presented on the display 104 of the client computing device 102 responsive to the client computing device 102 receiving an indication from a developer that a selected chatbot is to be updated. In example GUI 200, it is indicated that the selected chatbot is configured to assist an end user with ordering a pizza, and the system is currently displaying the various training dialogs in use by the chatbot as a textual listing. The training dialogs represent correct conversation examples that the chatbot can use and learn from.

Specifically, GUI 200 depicts an example user interface that can be used by a developer to create, search, sort, or filter various training dialogs that are in use by the chatbot. GUI 200 comprises various menu options, including a new training dialog button 202, wherein creation of a new training dialog between the developer and the chatbot is initiated responsive to the new training dialog button 202 being selected. GUI 200 can further include a tree view button 204, which will display a visual tree form of the various training dialogs in use by the chatbot. GUI 200 may also include a search field 206, allowing a developer to insert a query for training dialogs, and existing training dialogs can be searched based upon the received query. The search field 206 can be particularly useful when there are numerous training dialogs already in existence, thereby allowing the developer to relatively quickly identify training dialogs of interest. GUI 200 can further include a tag filter field 208, an entity filter field 210, and an action filter field 212, which allows for existing training dialogs to be filtered based upon various inputs, such as tags associated with the training dialogs, entities referenced in the training dialogs, and/or actions performed in the training dialogs. Such fields can be text entry fields, pull-down menus, or the like.

GUI 200 can further include a field 214 that includes several rows for existing training dialogs, wherein each row corresponds to a respective training dialog. Each training log can have an associated description (which may specify an initial input and a last input received from a developer), a tag associated with the specific training dialog (e.g., a training dialog may be tagged "reservation" due to the interaction with a developer resulting in a reservation at a restaurant), and a number "turns" in the training dialog (i.e., a total number of dialog turns between the developer and the chatbot, wherein a dialog turn is a portion of a dialog).

The various training dialogs displayed in field 214 are individually selectable by a developer. Upon selection of a training dialog, GUI presenter module 122 can generate a user interface depicting the specific dialog flow associated with the selected training dialog. It is to be understood that the information in the rows is set forth to assist the developer in differentiating between various training dialogs and finding desired training dialogs, and that any suitable type of information that can assist a developer in performing such tasks is contemplated.

While GUI 200 is useful in depicting the various training dialogs in use by the chatbot by way of field 214, with a sophisticated chatbot the number of training dialogs displayed in field 214 can become overwhelming and difficult to understand. It can also be difficult to determine how much of the conversation space has been covered and whether the chatbot may experience conflicting decision branches since the entire number of turns in the dialog can only be seen if a developer individual selects a specific training dialog to see the full number of turns. For example, in the training dialogs listing, a developer may have difficulty determining that one training dialog has the chatbot accepting a particular topping, while another training dialog may reject that topping due to the topping being out of stock, thus creating a conflict between the chatbot's actions depending on what inputs the chatbot has received.

To make the training dialog development process easier on the developer, a visual tree view of all of the existing training dialogs can be generated to provide a different representation of the current state of saved training dialogs 126. Upon selection of tree view button 204, GUI presenter module 122 can access training dialogs 126 stored in memory 114, and may generate a tree view that depicts the stored training dialogs. The tree view may be generated each time a developer selects tree view button 204, or in certain implementations, can be pre-generated and stored to memory 114 each time a developer adds or modifies a training dialog using, for example, various GUIs generated by GUI presenter module 122. It is to be appreciated that in certain instances, all of the stored training dialogs may not be displayed, and a subset of the stored training dialogs may be presented in tree view. Alternatively, a user may select a subset number of training dialogs via GUI 200 for display in the tree view.

FIG. 3 depicts an example GUI 300, which can be presented on the display 104 of the client computing device 102 responsive to a selection of tree view button 204. GUI 300 can include tree view 302 that depicts a tree form corresponding to the training dialogs of FIG. 2, which may be generated as a result of a developer selecting tree view button 204. GUI 300 can depict the various training dialogs in use by the chatbot, along with decision branch points in an easy visual manner. Specifically, GUI 300 can display the various training dialogs as nodes of the tree that represent "rounds," such as round 304A.

Each node of the tree can have attributes associated with the round represented by the node, which may consist of one or more inputs 306 to the chatbot system (e.g., text, an image, etc.), one or more states 308 for the chatbot at a particular point in time based on the inputs, and one or more actions 310 that the chatbot will take in response to the inputs. It is to be appreciated that tree view 302 is only an example, and in certain instances, any of inputs 306, states 308, and/or actions 310 may be displayed as individual nodes in a tree view.

Inputs 306 refer to inputs that are received from a user currently using the chatbot, which typically will be some natural language string of text for the chatbot to operate on, but in some instances may include button inputs, image inputs, biometric inputs, etc. States 308 refer to the current memory state of the chatbot, such as when "peppers" and "onions" are requested as toppings, the memory state of the chatbot can reflect "Toppings" as having entities "peppers" and "onions." Finally, actions 310 refer to the output that the chatbot takes in response to the input, given a certain state of the chatbot.

For example, round 304A as depicted may represent a plurality of different training dialogs, based on the chatbot system determining that the inputs for the training dialogs are alternative variations of the same input. With reference to round 304A, the chatbot system can determine that inputs 306 all are equivalent as they are inputs directing the chatbot to order a pizza with at least one Toppings entity specified.

Generally, the chatbot system can determine equivalence between inputs when the state 308 of the chatbot reflects that the set of entities extracted from the input common, irrespective of the values of the entities (i.e., the existence of a Topping entity, be it mushrooms or cheese). Furthermore, the chatbot system can confirm that the entities in previous turns were common (i.e., both training dialogs had previous turns that specified an entity of, for example, "CrustType"), and that the actions 310 associated with the training dialogs are common (i.e., the training dialogs both, for example, issue an API call to FinalizeOrder). In certain instances, two training dialogs can still be determined to be equivalent if one includes additional actions after a shared common action.

As such, while inputs 306 are shown as separate training dialogs in field 214 of FIG. 2, they can be merged into a single round for purposes of the tree view because the inputs (albeit being different) result in one or more common states 308 and common actions 310. Specifically, as a result of each of inputs "Order a cheese pizza," "Pizza with peppers and olives," and "Mushroom pizza," the chatbot can determine that one or more Toppings entities were introduced in the input, and as such, the state 308 of the chatbot can reflect "(1) Toppings" as indicating that the chatbot state memory is currently storing toppings for the pizza. Furthermore, the actions 310 to be taken by the chatbot are also common between the training dialogs based on the chatbot state 308.

In contrast, when generating tree view 302, the chatbot system can create a second round 304B that can be split from round 304A based at least on requiring different actions to be taken, or based at least on the chatbot's state being different based on the inputs. With reference to round 304B, because the inputs associated with those training dialogs do not specify at least one topping (i.e., there is no match of a Toppings entity), the state of the chatbot based on those inputs is different from the state associated with round 304A, because no toppings were specified. Instead, in the training dialogs merged into round 304A, a user has simply directed the chatbot to assist with ordering a pizza without specifying any particular toppings, and as such, the state associated with round 304B is "(0)" as reflecting that nothing is currently stored in the chatbot's memory.

As a further example of when branching in tree view 302 may occur, rounds 304C, 304D, and 304E can be compared. Specifically, a branching occurred between the three rounds due to at least one of a different action being performed, or a different chatbot state being present. While rounds 304C and 304D have a same state 308, the actions 310 associated with each round are different, as an input associated with round 304D indicated that a user does not wish to add any additional toppings. As such, an API call to code 120 can be performed to invoke a FinalizeOrder function within the code. Because the action of "API: FinalizeOrder" is not an action associated with round 304C, tree view 302 depicts a decision split between these rounds.

Similarly, round 304E is depicted as a decision split because the chatbot state 308 associated with that round is different from rounds 304C and 304D, in that the state reflects "(2) Toppings, OutOfStock" that resulted from a user input attempting to add a topping that is not in stock. Additionally, the actions associated with round 304E are also different, since an API call must be performed to invoke an OutOfStock function to indicate to a user that the requested topping is unavailable.

In certain instances, tree view 302 can also depict useful information to a developer specifying the type of decisions that are being made by the chatbot. As noted earlier, a chatbot can be a combination of multiple learning methods, such as by use of declarative rules that are provided by a developer, which can then be supplemented by machine learning. In certain instances, the chatbot may be initially based on machine learning methods, and refining declarative rules can be added once the chatbot develops some initial logic based on the machine learning.

Tree view 302 can therefore be generated to specify whether certain aspects of the chatbot resulted from declarative rules or from machine learning. For example, as depicted in tree view 302, a branch from round 304A to 304C may use a single connection line, which may be used to indicate to a developer that the decision was based on a declarative rule, while the branch from round 304A to 304E may use a double connection line, which may be used to indicate to the developer that the decision was based on machine learning. It is to be appreciated that the use of single and/or double lines for branches is only an example, and that other types of identifying characteristics could be used, such as by coloring branches different colors depending on whether it is based on rules or machine learning. Furthermore, although not shown in tree view 302, the rounds could be displayed differently depending on if certain states associated with the rounds resulted from declarative rules or machine learning.

GUI 300 may additionally have a return button 312, which when selected by a developer, can return the developer to the training dialogs page depicted by GUI 200. Upon invoking return button 312, the chatbot system may automatically record any changes made to the training dialogs and/or rules as a result of developer interaction with tree view 302, and may update training dialogs 126 stored in memory 114, along with any associated rules that may have been updated. In certain instances, the updating of training dialogs 126 can occur concurrently with edits received via tree view 302, and as such, invoking return button 312 can require simply reloading the training dialogs 126 from memory 114 without any additional processing.

FIG. 3B depicts a subsection of tree view 302 focusing on round 304C in larger detail, showing inputs 306, states 308, and actions 310 associated with the round. When generated, tree view 302 can provide a developer not only the ability to visualize the logic flow of the chatbot based on the current training dialogs, but can also allow the developer to edit any training dialogs and rules based on the visualized tree view. Specifically, various elements of tree view 302 are selectable by a developer through the GUI using, for example, mouse cursor 314.

In one example, assuming a developer wanted to edit a training dialog of "Add extra cheese" by adding an action for the chatbot to ask for a type of crust that the user prefers. The developer can use mouse cursor 314 to select that specific training dialog, and upon receiving a selection of the training dialog, the full training dialog associated with "Add extra cheese" can be displayed on the GUI, where the developer can add a one or more turns associated with that training dialog to determine the appropriate crust to use. Upon returning to tree view 302, round 304C can be updated based on the changes made to the training dialog.

Furthermore, a developer could want to add a new rule associated with action 310, and could therefore click on the specific action in question, such as by clicking on action "Added $Toppings!" by way of cursor 314. For example, a developer could add an additional rule to this action specifying that at least one "Toppings" entity must be in state 308 for the action to be valid, thereby providing an additional check to ensure that the appropriate gatekeeping to certain actions is being performed.

As shown in FIG. 3B, because tree view 302 considers the training dialogs of "Add olives," "Add extra cheese," and "Add pepperoni" to be equivalents (due to their common use of Toppings entities), the change to the "Add extra cheese" training dialog can also be injected into the other training dialogs associated with round 304C due to their equivalent nature. As such, new inputs, states, actions, and/or rules could be specified by the developer on individual rounds within tree view 302. Furthermore, because certain other rounds may branch off of round 304C, any changes that are made to round 304C via tree view 302 can be injected into any rounds that are based on round 304C. Additionally, the developer may use mouse cursor 314 to select any of states 308 or actions 310 to display the associated logic and/or rules associated with the states or actions.

In certain instances, if the developer adds a new aspect to the tree view, such as a rounds, input, state, action, or rule, the introduction of the new aspect may change the behavior of existing training dialogs. For example, if a developer adds a new rule, certain dependent rounds with training dialogs may become inaccessible because the new rule blocks access to those decision branches. As such, GUI 300 may allow the developer to "replay" the train dialogs based on the newly created rule, and tree view 302 may highlight potentially invalid rounds and/or training dialogs as needing to be updated. Therefore, a developer could potentially visualize the impact of new rules or rule changes prior to committing to a rule change.

A developer may also utilize an options area 316 that can provide additional editing capabilities. For example, by selecting options button 316, a developer may be presented with options to add new decision branches, or replicate a round for ease of developing additional branches. Options area 316 could also provide a developer with the ability to drag the specific round to a different portion or area of tree view 302, causing the various training dialogs associated with that round to be injected into a different decision branch.

When generating tree view 302, the chatbot system may also attempt to determine whether there are any logic gaps in the tree structure, or whether any training dialogs conflict with other training dialogs in another part of the tree structure. For example, round 304C's final action asks a user "Would you like anything else?" and as such, a developer should specify both a positive answer path and a negative answer path to this final action, but in some instances, a developer may forget to include one path. In another example, the chatbot system may also alert a developer when two rounds have a common state, but the actions associated with that common state may conflict or differ.

As such, in this example, round 304C may display a warning symbol 318 or other such indicia that alerts the developer that there is a potential issue with the current tree structure at this point. For example, the chatbot system may alert a developer that round 304A has an action displaying "You have $Toppings added." in response to a state "(1) Toppings" while round 304C uses a different action of "Added $Toppings!" in response to the "(1) Toppings" state, and may suggest to the developer that the actions be modified to maintain consistency. A developer may, in some instances, select the warning symbol, and a description of the potential issue may be presented to the developer. At this point, the developer may address the issue by editing training dialogs, may indicate that the chatbot system should ignore the issue (i.e., to address a false positive by the chatbot system), or in some instances, may view a recommended resolution to the issue based on logic employed by the chatbot system.

Alternative Implementations

FIG. 4 depicts an example GUI 400 according to another implementation, in which a graph view 402 is depicted based on training dialogs 126. In this implementation, instead of using a tree form to visualize the training dialogs, a directed graph could be used to depict logic flow associated with the chatbot system. Specifically, while various rounds depicted in graph view 402 may involve different inputs, states, and/or actions associated with their training dialogs, ultimately each path in the logic flow may utilize a common training dialog.

For example, multiple rounds in graph view 402 may have a final action of "Would you like anything else?" and therefore commonly rely on a negative input to this action. At this point, the state of the chatbot can be determined to be common between the various rounds, and the final action would be common as making an API call to FinalizeOrder in code 120. Therefore, in generating graph view 402, the chatbot system can determine that round 404 is common between the various other rounds, and specify these connections via graph view 402.

Furthermore, it is to be appreciated that while this discussion is focused on chatbots, the general visual editing aspects can be equally useful in any conversational situation where decisions are being made based on rules or situations involving neural networks. For example, the tree view visualization process could be utilized to accurately determine the actions that an AI is taken, regardless of the application, and so techniques described herein may be applied to fields such as self-driving cars, intelligence defense systems, etc.

Example Chatbot Updating Method

Figure 5:
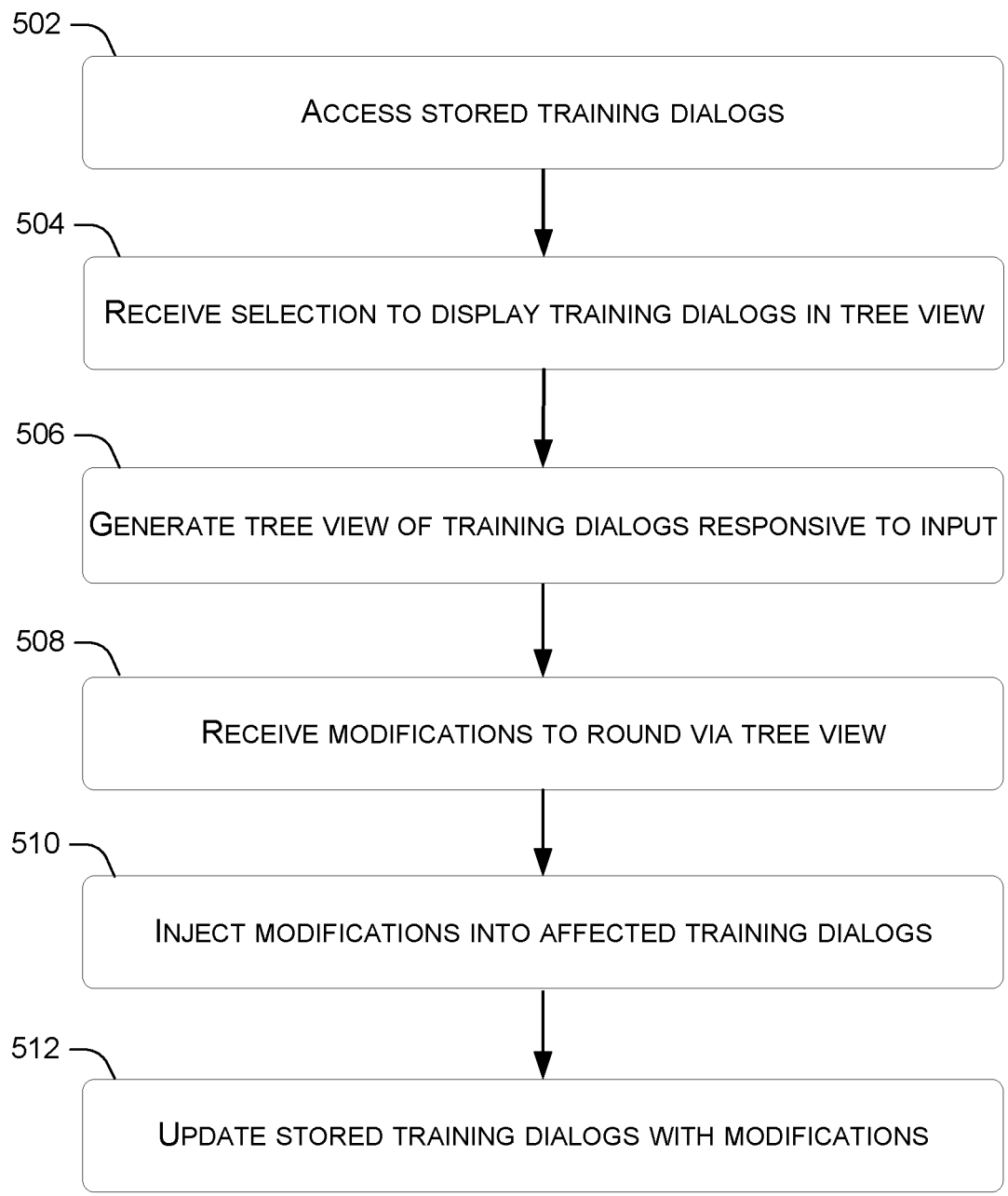
FIG. 5 illustrates an example method or technique that is consistent with some implementations of the present concepts.

The following discussion presents an overview of functionality that can enable updating of a chatbot via a tree view. FIG. 5 illustrates an exemplary method 500, consistent with the present concepts. Method 500 can be implemented by a single device, e.g., server 106, or can be distributed over one or more servers, client devices, etc. Moreover, method 500 can be performed by one or more modules, such as GUI presenter module 122, and updater module 124.

At block 502, one or more training dialogs that may be stored in memory 114 can be accessed that are associated with a conversational system, such as a chatbot. For example, a developer can utilize a GUI to load a particular chatbot, such as a pizza ordering bot, and stored training dialogs associated with the pizza ordering bot can be retrieved from memory 114 for display as a listing by GUI presenter module 122, such as by generating GUI 200.

At block 504, the system may receive an input to generate a tree view of the training dialogs presented by, for example, GUI 200. For example, a developer may select tree view button 204, which can result in GUI presenter module 122 accessing stored training dialogs 126 in memory 114, for purposes of generating a tree view.

At block 506, GUI presenter module 122 may parse the stored training dialogs to create a tree view of the stored training dialogs. In developing the tree view of the stored training dialogs, GUI presenter module 122 may execute tree building routines that are part of code 120 stored in memory 114.

As noted earlier with respect to FIG. 3, the tree view of the training dialogs creates one or more rounds that specify inputs, states, and actions for the chatbot, and may depict the rounds as nodes of the tree with branches representing decision points in the chatbot logic. Furthermore, multiple training dialogs can be merged into a single round based at least upon determining that the states and/or actions associated with one training dialog matches the states and/or actions associated with another training dialog. As such, even if inputs are found to be different for the training dialogs, the tree building routines can merge the training dialogs together into a single round for purposes of displaying in the tree view.

At block 508, the chatbot system may receive modifications to a round displayed on the tree view. Specifically, modifications to one of the training dialogs can be received based at least on a developer selecting one of the training dialogs associated with a particular round, and modifying certain aspects associated with that training dialog. Alternatively, a developer could select one of the actions associated with a particular round and provide modifications to the rules associated with the round.

Next, at block 510, the modifications to any training dialog and/or rules can then be injected into other training dialogs or rules that are part of the same round. Additionally, the modifications can be injected into any training dialogs or rules that may depend on the modified aspects of the modified round. It is to be appreciated that updater module 124 may update the affected training dialogs and/or rules on a temporary basis, in order to prevent accidently overwriting of stored data. Based on the modifications, GUI presenter module 122 may regenerate the tree view to accurately reflect the modifications.

Finally, at block 512, updater module 124 may update training dialogs 126 stored in memory 114, along with any updated rules, based at least upon receiving a confirmation to save the modifications. For example, a developer may select return button 312 depicted in GUI 300 to return to the training dialogs list depicted in GUI 200, and the chatbot system may display a confirmation to the developer as to whether the modifications that were received in tree view should be propagated to the stored training dialogs and rules.

Additional Examples

Various device examples are described above. Additional examples are described below. One example includes a method performed on a computing device. The method can include accessing one or more stored training dialogs associated with a conversational system. The method can also include receiving a selection to display the training dialogs in a tree form, and generating the tree form of the training dialogs based at least on the received selection, the tree form displaying the stored training dialogs as nodes with branches representing decision points. The method can further include updating the stored training dialogs based at least on modifications received to the tree form.

Another example can include any of the above and/or below examples, and can further include displaying a listing of the stored training dialogs as a textual listing on a graphical user interface, and responsive to the received selection to display the training dialogs in a tree form, displaying the generated tree form on the graphical user interface.

Another example can include any of the above and/or below examples wherein a node depicts one or more inputs, one or more current states for the conversational system, and one or more actions.

Another example can include any of the above and/or below examples wherein the modifications to the tree form comprise receiving a user selection to change an attribute associated with the one or more nodes of the tree form.

Another example can include any of the above and/or below examples wherein a plurality of stored training dialogs are merged into one or more common nodes based at least upon sharing a common state and a common action.

Another example can include any of the above and/or below examples where generating the tree form of the training dialogs can further include determining whether one or more training dialogs result in a conflict, highlighting, on the generated tree form, the conflict between the one or more training dialogs, and updating the generated tree form responsive to user input resolving the conflict between the one or more training dialogs.

Another example can include any of the above and/or below examples and can further include receiving new training dialogs through the tree form.

Another example can include any of the above and/or below examples wherein one or more of the decision points are based at least on machine learning.

Another example can include any of the above and/or below examples wherein one or more of the decision points are based at least on declarative rules.

Another example can include any of the above and/or below examples wherein the tree form displays branches representing decision points based at least on declarative rules simultaneously with branches representing decision points based at least on machine learning.

Another example can include any of the above and/or below examples and can further include retrieving the updated stored training dialogs that reflect the modifications made to the tree form responsive to user interaction with the conversational system, and outputting, by the conversational system, a natural language response to the user interaction based at least on the updated stored training dialogs.

Another example includes a method performed on a computing device. The method can include displaying on a graphical user interface (GUI) a visual tree representing training dialogs associated with a conversational system. The method can also include receiving a modification to one or more of the training dialogs via the GUI, propagating the modification to training dialogs in the visual tree that are dependent on the modified one or more training dialogs, and updating a database of training dialogs based at least on the received modification.

Another example can include any of the above and/or below examples, and can further include determining whether the modification to the one or more training dialogs results in a conflict, and providing an indication via the GUI indicating the conflict resulting from the modification.

Another example can include any of the above and/or below examples, and can further include updating the visual tree when a user resolves the conflict.

Another example can include any of the above and/or below examples, and can further include receiving a selection to display the training dialogs in a textual list form, wherein the received modification is reflected in the textual list form.

Another example can include any of the above and/or below examples, and can further include indicating, via the GUI, whether a decision in the visual tree resulted from declarative rules or machine learning.

Another example includes a system comprising a display configured to depict a graphical user interface, a processor, and a storage memory storing computer-readable instructions, which when executed by the processor, cause the processor to display, via the graphical user interface, data associated with training dialogs that represent interactions with a chatbot, receive an indication from a user of the system to display the data associated with the training dialogs in a tree form, determine whether decisions depicted in the tree form are based at least on declarative rules or based at least on machine learning, and display decisions based at least on declarative rules differently from decisions based at least on machine learning.

Another example can include any of the above and/or below examples wherein the decisions based at least on declarative rules are displayed using a different color than the decisions based at least on machine learning.

Another example can include any of the above and/or below examples wherein nodes of the tree form that are based at least on declarative rules are displayed using a different icon than nodes of the tree form based at least on machine learning.

Another example can include any of the above and/or below examples where the computer-readable instructions, when executed by the hardware processing unit, cause the hardware processing unit to receive a selection on a node of the tree form, and display editable data associated with the selected node.

Device Implementations

As noted above with respect to FIG. 1, system 100 may include several devices, including a client device 102, server 106, cloud server(s) 110, user device(s) 128, and interactive device(s) 130. As also noted, not all device implementations can be illustrated, and other device implementations should be apparent to the skilled artisan from the description above and below.

The term "device", "computer," "computing device," "client device," "server," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc. For example, a "chatbot system" can include one or more devices that perform processing of natural language, such as server 106, cloud server(s) 110, user device(s) 128, or interactive device(s) 130.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices, such as IoT devices, that communicate over network(s) 108. Without limitation, network(s) 108 can include one or more local area networks (LANs), wide area networks (WANs), the Internet, and the like.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A system comprising:
a processor; and
a storage memory storing computer-readable instructions, which when executed by the processor, cause the processor to:
access data associated with training dialogs employed to train a machine learning model used by a chatbot;
identify first declarative rule-based decisions of the chatbot that are based at least on declarative rules and second machine learning-based decisions of the chatbot that are based at least on machine learning from the training dialogs by the machine learning model used by the chatbot; and
present the first declarative rule-based decisions and the second machine learning-based decisions in a tree form where the first declarative rule-based decisions are presented in the tree form differently from the second machine learning-based decisions.

2. The system of claim 1, wherein the computer-readable instructions, when executed by the processor, cause the processor to:
depict the first declarative rule-based decisions in the tree form as first connections between rounds of dialog performed by the chatbot; and
depict the second machine learning-based decisions in the tree form as second connections between rounds of dialog performed by the chatbot.

3. The system of claim 2, wherein the first connections and the second connections are conveyed as different types of connecting lines.

4. The system of claim 2, wherein the first connections are depicted as single lines and the second connections are depicted as double lines.

5. The system of claim 2, wherein the computer-readable instructions, when executed by the processor, cause the processor to:
receive user input selecting and editing a particular second decision from the tree form; and
update the chatbot based at least on the user input.

6. The system of claim 5, wherein the computer-readable instructions, when executed by the processor, cause the processor to:
update an entity extractor of the chatbot based at least on a new entity identified by the user input.

7. The system of claim 5, wherein the computer-readable instructions, when executed by the processor, cause the processor to:
update a response model of the chatbot based at least on new output identified by the user input.

8. A method comprising:
accessing data associated with training dialogs employed to train a machine learning model used by a chatbot;
identifying first declarative rule-based decisions of the chatbot that are based at least on declarative rules and second machine learning-based decisions of the chatbot that are based at least on machine learning from the training dialogs by the machine learning model used by the chatbot; and
presenting the first declarative rule-based decisions and the second machine learning-based decisions in a graph form where the first declarative rule-based decisions are presented in the graph form differently from the second machine learning-based decisions.

9. The method of claim 8, wherein the graph form is a tree.

10. The method of claim 8, wherein the graph form is a directed graph.

11. The method of claim 8, further comprising:
depicting the first declarative rule-based decisions in the graph form as first connections between rounds of dialog performed by the chatbot; and
depicting the second machine learning-based decisions in the graph form as second connections between rounds of dialog performed by the chatbot.

12. The method of claim 11, wherein the first connections and the second connections are conveyed as different types of connecting lines.

13. The method of claim 11, wherein the first connections are depicted as single lines and the second connections are depicted as double lines.

14. The method of claim 8, further comprising:
receiving user input selecting and editing a particular second decision from the graph form; and
updating the chatbot based at least on the user input.

15. The method of claim 14, further comprising:
updating an entity extractor of the chatbot based at least on a new entity identified by the user input.

16. The method of claim 14, further comprising:
updating a response model of the chatbot based at least on new output identified by the user input.

17. A method comprising:
accessing data associated with training dialogs employed to train a machine learning model used by a chatbot;
presenting conversational rounds of the chatbot in a graph form, at least some of the conversational rounds being based on machine learning by the chatbot from the training dialogs;
receiving input dragging a particular round of the chatbot from a first branch of the graph form to a second branch of the graph form; and
updating the training dialogs employed to train the machine learning model used by the chatbot based at least on the dragging of the particular round of the chatbot from the first branch of the graph form to the second branch of the graph form.

18. The method of claim 17, wherein the updating comprises injecting particular training dialogs previously associated with the first branch into the second branch.

19. The method of claim 18, further comprising:
updating at least one of a response model or an entity extractor of the chatbot based at least on the injecting of the particular training dialogs into the second branch.

20. The method of claim 17, further comprising:
responsive to further user input, replicating another dialog round of the chatbot in an additional branch of the graph form.

* * * * *